(12) United States Patent
Inoue et al.

(10) Patent No.: US 7,098,880 B2
(45) Date of Patent: Aug. 29, 2006

(54) ELECTROOPTIC DEVICE, DRIVING METHOD THEREFOR, ELECTRONIC DEVICE, AND PROJECTION DISPLAY DEVICE

(75) Inventors: Ken Inoue, Suwa (JP); Toshiyuki Hirase, Hataka-machi (JP); Sadasumi Uchiyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 10/394,200

(22) Filed: Mar. 24, 2003

(65) Prior Publication Data
US 2003/0218593 A1 Nov. 27, 2003

(30) Foreign Application Priority Data
Mar. 28, 2002 (JP) .............................. 2002-093147

(51) Int. Cl.
*G09G 3/36* (2006.01)
*G02F 1/133* (2006.01)

(52) U.S. Cl. .......................................... 345/87; 349/33
(58) Field of Classification Search .......... 345/87–104, 345/211–213; 349/33–55
See application file for complete search history.

(56) References Cited

U.S. PATENT DOCUMENTS

| | | | | |
|---|---|---|---|---|
| 5,430,460 A | | 7/1995 | Takabatake et al. | |
| 5,572,735 A | * | 11/1996 | Tanikawa | 713/300 |
| 5,793,346 A | * | 8/1998 | Moon | 345/92 |
| 5,945,970 A | * | 8/1999 | Moon et al. | 345/92 |
| 6,005,541 A | * | 12/1999 | Takahashi et al. | 345/87 |
| 6,064,360 A | * | 5/2000 | Sakaedani et al. | 345/92 |
| 6,262,705 B1 | | 7/2001 | Inoue et al. | |
| 6,304,256 B1 | * | 10/2001 | Nagaya | 345/211 |
| 6,690,345 B1 | * | 2/2004 | Hanzawa et al. | 345/95 |
| 6,731,258 B1 | * | 5/2004 | Lin et al. | 345/87 |
| 2001/0009411 A1 | * | 7/2001 | Kusanagi | 345/93 |
| 2001/0020928 A1 | * | 9/2001 | Yanagisawa et al. | 345/98 |
| 2002/0063667 A1 | * | 5/2002 | Nakamura et al. | 345/87 |
| 2002/0105490 A1 | * | 8/2002 | Kanbe et al. | 345/87 |

FOREIGN PATENT DOCUMENTS

| | | |
|---|---|---|
| EP | 0 605 846 A1 | 7/1994 |
| EP | 0 764 932 A2 | 3/1997 |
| JP | 2-204718 | 8/1990 |
| JP | A 2000-89193 | 3/2000 |
| JP | A 2000-163025 | 6/2000 |
| JP | 2001-264723 | 9/2001 |

\* cited by examiner

*Primary Examiner*—Richard Hjerpe
*Assistant Examiner*—M. Fatahiyar
(74) *Attorney, Agent, or Firm*—Oliff & Berridge, PLC

(57) ABSTRACT

The invention provides an electrooptic device that can include a first substrate on which pixel electrodes, first thin film transistors electrically connected to the pixel electrodes, and scanning lines and data lines electrically connected to the first thin film transistors are formed, a second substrate opposing the first substrate and having a common electrode, and an electrooptic substance held between the first substrate and the second substrate. The electrooptical device can further include a switching element for discharging in capacitors constituted by the pixel electrodes on the first substrate, the electrooptic substance, and the common electrode on the second substrate. The invention makes it possible to remove charges from inside the electrooptic device.

16 Claims, 10 Drawing Sheets

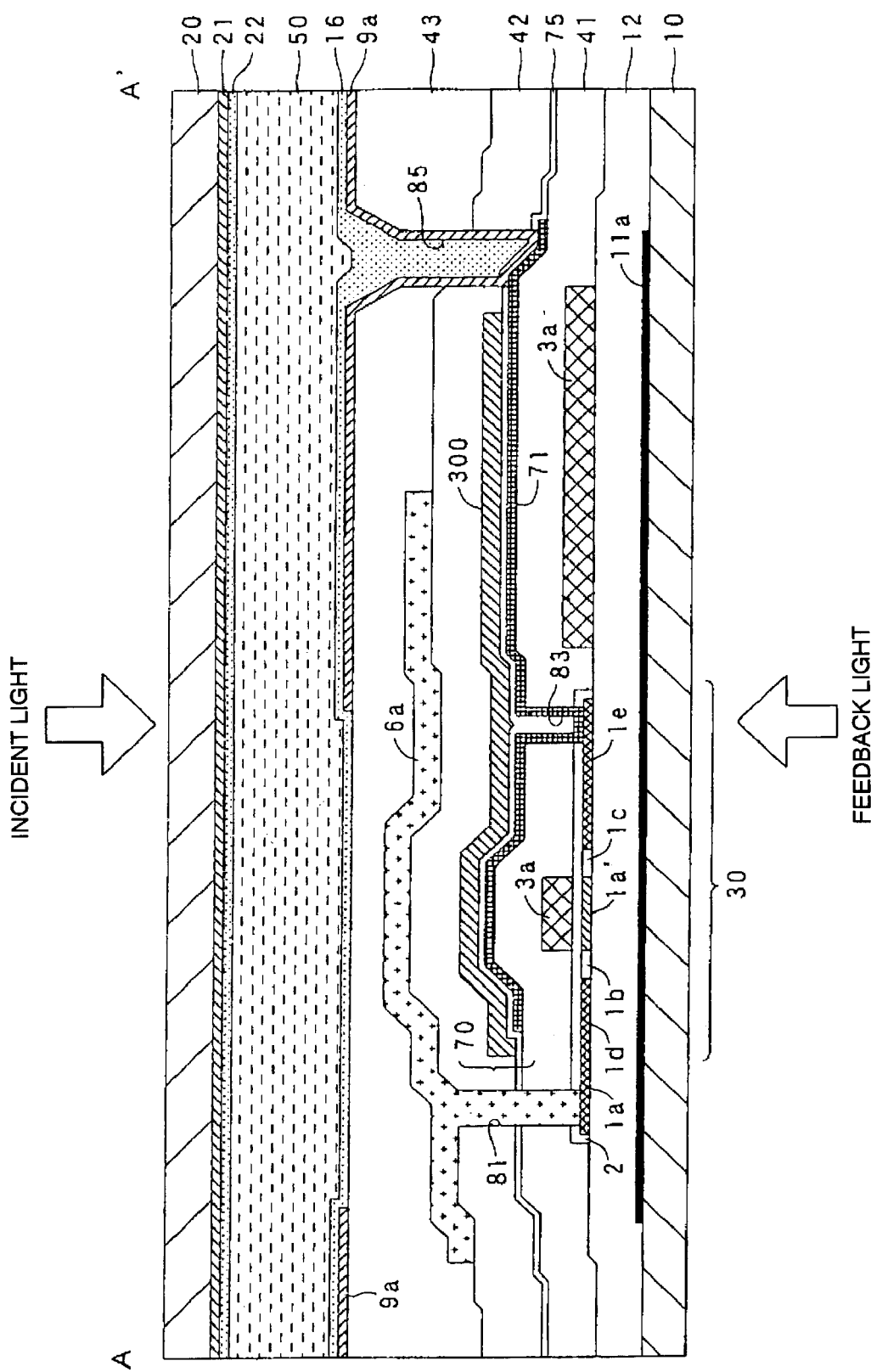

ELECTROOPTIC DEVICE, DRIVING METHOD THEREFOR, ELECTRONIC DEVICE, AND PROJECTION DISPLAY DEVICE

BACKGROUND OF THE INVENTION

1. Field of Invention

The present invention relates to technical fields of electrooptic devices and electronic devices. More particularly, the invention relates to technical fields of an electrooptic device having various capacitors in which charges are accumulated, a driving method therefor, an electronic device, and a projection display device.

2. Description of Related Art

Currently, electrooptic devices are known which can be driven by a so-called active matrix driving method by having pixel electrodes arranged in a matrix, thin film transistors (TFT) connected to the pixel electrodes, scanning lines and data lines provided in parallel in rows and columns, and the like. Such electrooptic devices can further include a TFT array substrate on which the TFTs, the pixel electrodes, and the like described above are formed, a counter substrate opposing the TFT array substrate and having a common electrode, and an electrooptic substance, such as liquid crystal, sandwiched between the TFT array substrate and the counter substrate (liquid crystal). By supplying a driving voltage, a driving signal, an image signal, and the like to a scanning-line driving circuit and a data-line driving circuit that are connected to the scanning lines and the data lines, a predetermined electric field is applied to the liquid crystal through the pixel electrodes, and the light transmittance ratio is changed in each pixel by the resulting state change of the liquid crystal, so that an image can be displayed.

However, conventional electrooptic devices have the following problem. While a driving voltage, a driving signal, an image signal, and the like are necessary to drive an electrooptic device, as described above, no special consideration is given to a way to turn off these various signals when the device is powered off. Therefore, irregular charges inevitably remain everywhere inside the electrooptic device during operation of the electrooptic device.

In a state in which such charges remain inside the electrooptic device, when the device is powered on again, an image resulting from the charges sometimes appears on an image. For example, in a case in which letters "ABC" are displayed on an image immediately before the device is powered off, when the device is powered on next, the letters "ABC" in the preceding use appear like afterimages.

Incidentally, it was first considered that charges remained in capacitors (so-called "liquid crystal capacitors") formed by the TFT array substrate, the liquid crystal, and the counter substrate described above. In a case in which the electrooptic device has storage capacitors, the above-described problem tends to be more pronounced. The storage capacitors are capacitors that improve the potential holding characteristics of pixel electrode and enhance image quality by holding a voltage applied to the pixel electrodes for a predetermined period until the next image signal is applied to the pixel electrodes. However, such provision of storage capacitors is equal to the addition of new places in which charges are accumulated inside the electrooptic device, and the above problem appears more pronouncedly.

In addition, in recent electrooptic devices, the cell gap between the TFT array substrate and the counter substrate is further reduced, and the structure of the storage capacitors is complicated in order to achieve size reduction and high definition. Consequently, it is more difficult to remove accumulated charges, and there is a greater fear that the above problem will arise.

SUMMARY OF THE INVENTION

The present invention has been made in view of the above problem, and an object of the present invention is to provide an electrooptic device that can perform high-quality image display so that an afterimage or the like due to charges accumulated therein is not formed on an image, a driving method therefor, an electronic device, and a projection display device.

In order to overcome the above problem, an electrooptic device of the present invention can include a first substrate having pixel electrodes, first thin film transistors electrically connected to the pixel electrodes, and scanning lines and data lines electrically connected to the first thin film transistors, a second substrate opposing the first substrate and having a common electrode, an electrooptic substance held between the first substrate and the second substrate, and a switching element for discharging inside capacitors formed by the pixel electrodes above the first substrate, the electrooptic substance, and the common electrode above the second substrate.

In the electrooptic device of the present invention, so-called active matrix driving can be performed by controlling the operation of the first thin film transistors through the scanning lines and supplying an image signal to the pixel electrodes via the first thin film transistors through the data lines. By setting the common electrode at a predetermined potential, a predetermined potential difference can be formed between the pixel electrodes and the common electrode, and therefore, the state of the electrooptic substance held therebetween can be changed.

In particular, the present invention can includes the switching element that discharges inside the capacitors formed by the pixel electrodes, the electrooptic substance, and the common electrode. For example, in a case in which the electrooptic substance is liquid crystal, liquid crystal capacitors generally correspond to the capacitors. By operating such a switching element at at least one point in time immediately after the electrooptic device is powered on and a time point immediately before the electrooptic device is powered off, charges inside the liquid crystal capacitors can be removed. Therefore, since the present invention allows charges inevitably accumulated during operation of the electrooptic device to be removed effectively, an afterimage or the like due to the charges will not be formed on an image, and high-quality image display is possible.

The electrooptic device of the present invention that does not allow charges to remain provides the following operational advantages. That is, for example, when charges are accumulated in the above liquid crystal capacitors, a direct-current component is constantly applied to the liquid crystal. When this continues, the liquid crystal is sometimes deteriorated. Moreover, the first substrate and the second substrate are usually bonded at their peripheries with a sealing material, and alignment films are generally formed on the sides thereof in contact with the liquid crystal. When the above charges remain in the liquid crystal capacitors, the sealing material and the alignment films may be deteriorated. In the present invention, since charges inside the electrooptic device can be removed, such deterioration of the liquid crystal, the sealing material, the alignment films can be prevented.

The switching element in the present invention may take various specific forms, for example, a two-terminal element or a three-terminal element. In the present invention, it should be understood that no special limitation is imposed on the specific form as long as the switching element has a function of discharging inside the liquid crystal capacitor.

While various specific methods for discharging the liquid crystal capacitors by the switching element and various specific positions of the switching element are possible, it should be understood that the present invention is not limited thereto. Typically, for example, discharging methods and positions described in the following embodiments of the present invention are effectively selected. Moreover, the pixel electrodes and the common electrode may be grounded, or may be short-circuited. The switching element may be provided to carry out these methods.

In a mode of the electrooptic device of the present invention, the switching element includes first switching elements provided in the data lines to selectively drop the potentials of the data lines to the ground potential.

In the electrooptic device of the present invention, the potentials of the data lines can be dropped to the ground potential by the first switching elements. Therefore, it is possible to remove charges accumulated in line capacitors of the data lines or in the pixel electrodes connected to the data lines through the first thin film transistors. Furthermore, when the common electrode is formed on the entire surface of the second substrate, the above-described capacitors between the first and second substrates, that is, the liquid crystal capacitors can be properly discharged by dropping the potentials of the data lines only to the ground potential. This is because it is occasionally conceivable that spontaneous discharging easily occurs in such a full-surface common electrode and the common electrode is naturally set to the ground potential. Therefore, in this mode, charges inside the liquid crystal capacitors can be removed only with the required minimum structure.

In another mode of the electrooptic device of the present invention, the switching element further includes a second switching element provided in a common potential line for maintaining the common electrode at a fixed potential to selectively drop the potential of the common potential line to the ground potential.

In this mode, since the potentials of the common potential line and the common electrode can also be dropped to the ground potential by the second switching element, charges accumulated inside the electrooptic device, including the liquid crystal capacitors, can be removed more effectively. Therefore, it is possible to display images of higher quality than refereed to the above.

A further mode of the electrooptic device of the present invention further includes a precharge circuit for supplying a precharge signal at a predetermined voltage level to the data lines through a precharge line, and the switching element includes a third switching element provided in the precharge line to selectively drop the potential of the precharge line to the ground potential. In this mode, the third switching element having functions substantially similar to those in the above is provided in the precharge line extending from the precharge circuit to the data lines. Since charge accumulated inside the electrooptic device can also be removed through the data lines and the precharge line, high-quality image display is possible.

A further mode of the electrooptic device of the present invention further can include a control device that executes control so that the potential of the switching element is dropped to the ground potential at at least one point in time after the electrooptic device is powered on and a time point before the electrooptic device is powered off.

In this mode, for example, the control device can execute control so that the potential of the switching element is dropped to the ground potential after the electrooptic device is powered on. In this case, for example, charges accumulated inside the electrooptic device can be removed in advance of an actual use. By executing similar control before the electrooptic device is powered off, charges accumulated during the use can be removed, and the charges do not have any influence at the next use.

As described above, this mode allows the switching element to be operated at the most preferable timing. In this mode, of course, for example, it is possible to perform one control operation before the electrooptic device is powered off and to perform one control operation after the electrooptic device is powered on.

A further mode of the present invention further includes storage capacitors connected to the first thin film transistors. In this mode, since the storage capacitors are provided, the potential holding characteristics of the pixel electrodes can be improved, and this contributes to high-quality image display. This is an operational advantage primarily expected by the provision of the storage capacitors.

However, the provision of such storage capacitors is equivalent to the addition of new portions in the electrooptic device in which charges are easily accumulated when the power is turned off. Therefore, this is not necessarily preferable from the point of preventing an afterimage on an image that is sometimes viewed after the power is turned on and off, as described in the background of the invention.

In this mode, charges accumulated inside the electrooptic device can be removed by providing the switching element for discharging in the liquid crystal capacitor or the first to third switching elements on the data lines, the common potential line, and the precharge line included in the switching element, as described above. This means that, even when unnecessary charges are accumulated in the storage capacitors, they can be removed effectively.

Therefore, in this mode, a higher image quality can be enjoyed by the above-described improvement of the potential holding characteristics that is inherent in the storage capacitors, and the problem due to the provision of storage capacitors can be solved at the same time. In this way, this mode achieves generally high-quality image display.

In this mode, in particular, it is preferable that the pixel electrodes be arranged in a matrix, that the scanning lines and the data lines be arranged in a form corresponding to the matrix, and that the storage capacitors be formed on the first thin film transistors and corresponding to a region in which the scanning lines and the data lines are arranged.

In such a configuration, the storage capacitors constitute a multilayer structure with the first thin film transistors, and are formed as if they are crowded into non-aperture regions. Consequently, it is possible to increase the aperture ratio of the electrooptic device and to display brighter images. While the matrix form can be assumed, for example, a form in which a plurality of pixel electrodes are arranged in rows and columns to make a substantially rectangular form as a whole, the non-aperture regions (that is, regions substantially identical to regions in which the scanning lines and the data lines are arranged) are formed in a lattice in this case. In this configuration, the storage capacitors are formed in a lattice as a whole.

However, such storage capacitors have a more complicated structure, and charges accumulated therein are not easily removed. Since the present invention can effectively remove charges, as described above, it can effectively cope with such a problem.

As described above, this configuration can achieve a high-quality image display as a whole because of the operational advantage of bright image display and the operational advantage of reduction of noise on images due to accumulated charges.

In a further mode of the electrooptic device of the present invention, the switching element is formed on the first substrate and is formed of a second thin film transistor, and a semiconductor layer that forms the second thin film transistor is the same as semiconductor layers that form the first thin film transistors.

In this example, the semiconductor layer that forms the second thin film transistor serving as the switching element in the present invention and the semiconductor layers that form the first thin film transistors are the same, that is, can be simultaneously formed during the same production process, and therefore, production cost can be reduced. That the semiconductor layers that are the most substantial parts of the thin film transistors can be thus produced commonly means that other parts necessary to constitute the thin film transistors, for example, a gate insulating film and a gate electrode, can be produced commonly. Therefore, production cost can be further reduced.

Incidentally, the above-described simultaneous formation can be easily achieved by, for example, collectively patterning original films by photolithography.

Of course, operation reliability can be improved by making the switching element of a thin film transistor.

In order to solve the above problem, an electrooptic-device driving method of the present invention can drive an electrooptic device including, on a substrate, pixel electrodes, thin film transistors electrically connected to the pixel electrodes, and scanning lines and data lines electrically connected to the thin film transistors. The driving method can include a step of applying an image signal representing the single-color image display to the pixel electrodes at least one point in time after the electrooptic device is powered on and a time point before the electrooptic device is powered off.

In the electrooptic-device driving method of the present invention, images can be displayed, for example, by providing, in addition to the substrate having pixel electrodes and the like (control substrate), a counter substrate opposing the control substrate and having a common electrode, and an electrooptic substance, such as liquid crystal, held between the control substrate and the counter substrate.

In other words, when an appropriate voltage is applied to the pixel electrode through the data line, a predetermined electric field is applied between the pixel electrode and the common electrode, and changes the state of the electrooptic substance. In this case, the electric field is applied and the state of the electrooptic substance is changed when the operation of the thin film transistor is controlled through the scanning line, and the thin film transistor is turned on. Since the light transmittance then changes in accordance with the change of the state of the electrooptic substance, images can be displayed by performing this operation for each of the pixels on the control substrate. Herein, the pixel corresponds to each of the pixel electrodes when the pixel electrodes are arranged in a matrix.

In the present invention, in particular, an image signal representing the single-color image display is applied to the pixel electrodes at at least one of the time point after the electrooptic device is powered on and the time point before the electrooptic device is powered off. Specifically, the image signal representing the single-color image display (single-color signal) refers to an image signal that represents a display of only one arbitrary tone when display in 255 tones is possible, and more preferably, it has been verified that the following advantage can be appropriately obtained by using the image signal corresponding to any tone higher than the 19th tone of the 255 tones (this applies to a normally white mode which will be described below, and the reverse applies to a normally black mode). It is more preferable that the signal represent an image display of only one extreme color, for example, white or black. That is, in a case in which the electrooptic substance is liquid crystal, the liquid crystal molecules are aligned in a state such as to completely transmit light or in a state such as to completely block light.

For example, by applying such a single-color signal after the device is powered on or before the device is powered off (more preferably, after the device is powered on and before an actual use in which image-display is actually performed, that is, immediately after power-on, or after an actual use in which image display is actually performed and before the device is powered off, that is, immediately before power-off, this also applies to the following), the electrooptic substance is placed in the same state at the time point, and the data lines and the pixel electrodes have the same potential. Consequently, charges accumulated inside the electrooptic device can be removed. Therefore, in the driving method of the present invention, an afterimage due to charges accumulated during the preceding use will not appear on an image during the next use, and high-quality image display is possible.

It is needless to say that the step of applying the single-color signal may be performed both before the electrooptic device is powered off and after the electrooptic device is powered on. In some cases, the single-color signal may be applied at any time after the electrooptic device is powered on. This allows charges to be removed at any time. For example, in a case in which a single-color signal is applied before the electrooptic device is powered off, it may be applied only to pixels corresponding to any image, character, or the like finally displayed on the screen, according to the circumstances. However, since the accumulation of charges is primarily irregular, it is preferable that the above-described single-color signal be applied to the pixel electrodes in the entire screen.

In the present invention, it is preferable that the step of applying the single-color signal to the pixel electrodes include a step of turning on the thin film transistors. This is because the step can be performed substantially instantaneously in some cases. Even if the step of turning on the thin film transistors is not included, the single-color signal is applied to the pixel electrodes via the thin film transistors, which are not perfectly ideal switching elements, by passing the single-color signal through the data lines. While the above advantage cannot be sufficiently expected, charges in the line capacitors, such as the data lines, can be removed, and therefore, reasonable operational advantages can be achieved. Accordingly, the step of the present invention does not always need to include the step of turning on the thin film transistors.

In a mode of the electrooptic-device driving method of the present invention, the electrooptic substance can include liquid crystal, and the image signal is a full-white level signal for a white display on the entire screen when the electrooptic device is driven in a normally white mode in which the alignment direction of the liquid crystal changes to decrease the light transmittance, depending on the voltage applied to the pixel electrodes. In this mode, a full-white level signal for a white display on the entire screen is used in a mode in which the light transmittance decreases depending on the applied voltage, that is, in a normally white mode. Consequently, since no voltage is applied or the minimum voltage is applied to all the pixels, charges accumulated in the liquid crystal capacitors, the storage capacitors, or the like can be removed effectively.

In another mode of the electrooptic-device driving method of the present invention, the electrooptic substance can include a liquid crystal, and the image signal is a full-black level signal for a black display on the entire screen when the electrooptic device is driven in a normally black mode in which the alignment direction of the liquid crystal changes to increase the light transmittance, depending on the voltage applied to the pixel electrodes.

This mode is inversely related to the above mode. When the electrooptic device is driven in a normally black mode, a full-black level signal for a black display on the entire screen is used. Therefore, charges accumulated in the liquid crystal capacitors, the storage capacitors, or the like can be effectively removed, in a manner similar to the above.

In a further mode of the electrooptic-device driving method of the present invention, the step of applying the image signal to the pixel electrodes through the data lines is performed before the electrooptic device is powered off, and the method includes a step of turning off a driving voltage or a driving signal after the above step.

In this mode, for example, in a case in which the above full-white level signal is used, after the full-white level signal is input and a state in which no electric field is applied to the liquid crystal is brought about, the driving voltage or the driving signal is turned off. Therefore, the remaining charges can be minimized. In this mode, the step of turning off a driving voltage or a driving signal includes not only a step of turning off only the driving voltage or only the driving signal, but also a step of turning off both. This also applies to a mode of the present invention which will be described next.

In a further mode of the electrooptic-device driving method of the present invention, the step of applying the image signal to the pixel electrodes through the data lines is performed after the electrooptic device is powered on, and the method includes a step of turning on a driving voltage or a driving signal before the above step.

This mode is inversely related to the above mode. In a state in which the driving voltage or the driving signal is turned on, a single-color signal, such as a full-white level signal or a full-black level signal, is applied. That is, the electrooptic device can be reset before an image signal containing normal image information is input.

In order to solve the above problem, another electrooptic-device driving method of the present invention drives an electrooptic device including, on a substrate, pixel electrodes, thin film transistors electrically connected to the pixel electrodes, and scanning lines and data lines electrically connected to the thin film transistors. The driving method includes a step of dropping the potentials of the data lines to a ground potential at at least one point in time after the electrooptic device is powered on and a time point before the electrooptic device is powered off.

Since the electrooptic-device driving method of the present invention includes the step of dropping the potentials of the data lines to the ground potential at at least one point in time after the electrooptic device is powered on and a time point before the electrooptic device is powered off, charges accumulated in the liquid crystal capacitors and the like can be removed through the data lines. In this case, it is quite possible that charges in the liquid crystal capacitors will be removed only by dropping the potentials of the data lines to the ground potential, as described in the above mode of the electrooptic device in which the potentials of the data lines are dropped to the ground potential.

A mode of the electrooptic-device driving method of the present invention can further include a step of setting a common potential line to the ground potential, the common potential line being connected to the substrate to maintain a common electrode formed above a counter substrate opposing the substrate with an electrooptic substance therebetween at a fixed potential.

In the mode of the electrooptic-device driving method of the present invention, since the common potential line and the common electrode are also set at the ground potential, charges accumulated inside the electrooptic device can be removed more effectively. Therefore, it is possible to display images of higher quality than the above.

When the data lines and the common potential line are set to the ground potential, in the present invention, it should be understood that it is not particularly limited which line is first set. Of course, the present invention also includes a case in which the data lines and the common potential line are simultaneously set to the ground potential.

In order to solve the above problem, an electronic device of the present invention can include the above-described electrooptic device of the present invention (including various modes). Since the electronic device of the present invention includes the above electrooptic device of the present invention, charges accumulated therein can be removed effectively. Therefore, it is possible to achieve various electronic devices, such as a liquid crystal television, a portable telephone, an electronic notebook, a word processor, a view-finder or direct-view video tape recorder, a workstation, a picturephone, a POS terminal, and a touch panel, which can display high-quality images without displaying any image due to the charges on the screen.

In order to solve the above problem, a projection display device of the present invention includes a light valve formed of the above electrooptic device (including various modes), a light source for introducing projection light into the light valve, and an optical system for projecting the projection light emitted from the light valve. In the projection display device of the present invention, the electrooptic device of the present invention is applied to a light valve that constitutes a projection display device (liquid crystal projector) as an example of the above-described electronic device.

These functions and other advantages of the present invention will be apparent from the following description of embodiments.

BRIEF DESCRIPTION OF THE DRAWINGS

The invention will be described with reference to the accompanying drawings, wherein the numerals reference like elements, and wherein:

FIG. 10 is a cross-sectional view, taken along line A–A' in FIG. 9.

DETAILED DESCRIPTION OF PREFERRED EMBODIMENTS

Embodiments of the present invention will be described below with reference to the drawings. In the following embodiments, an electrooptic device of the present invention is applied to a liquid crystal device, and the liquid crystal device is further applied to a projection display device.

Figure 1:
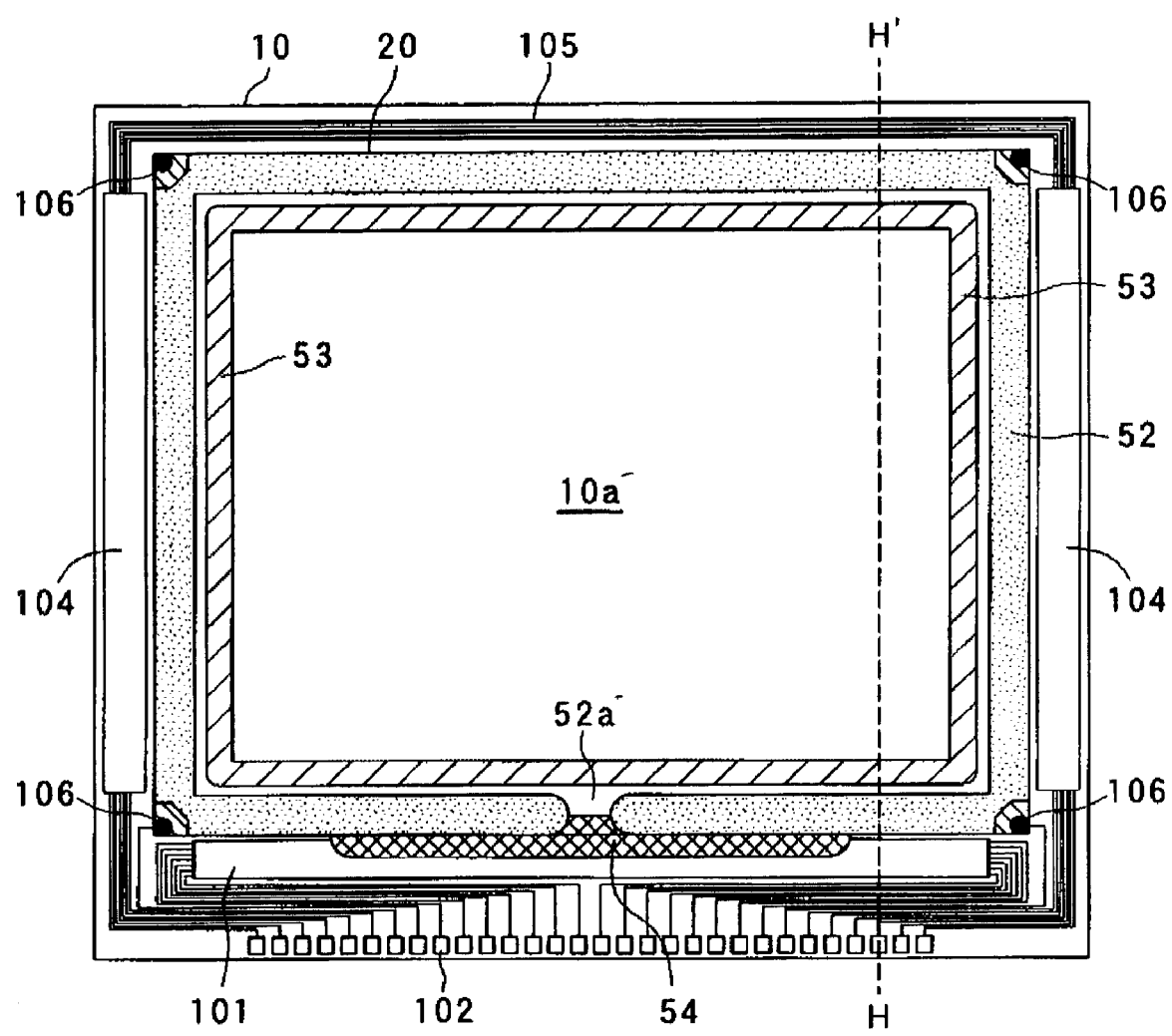
FIG. 1 is a plan view of a TFT array substrate and components formed thereon, as viewed from the side of a counter substrate.
Figure 2:
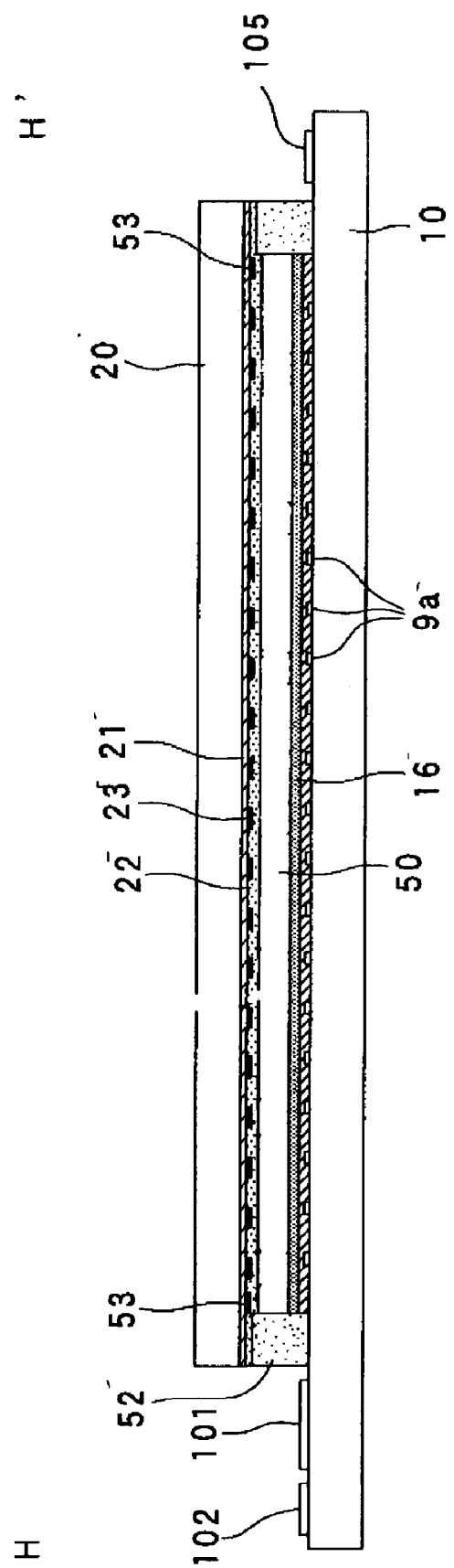
FIG. 2 is a cross-sectional view, taken along line H–H' in FIG. 1.
Figure 3:
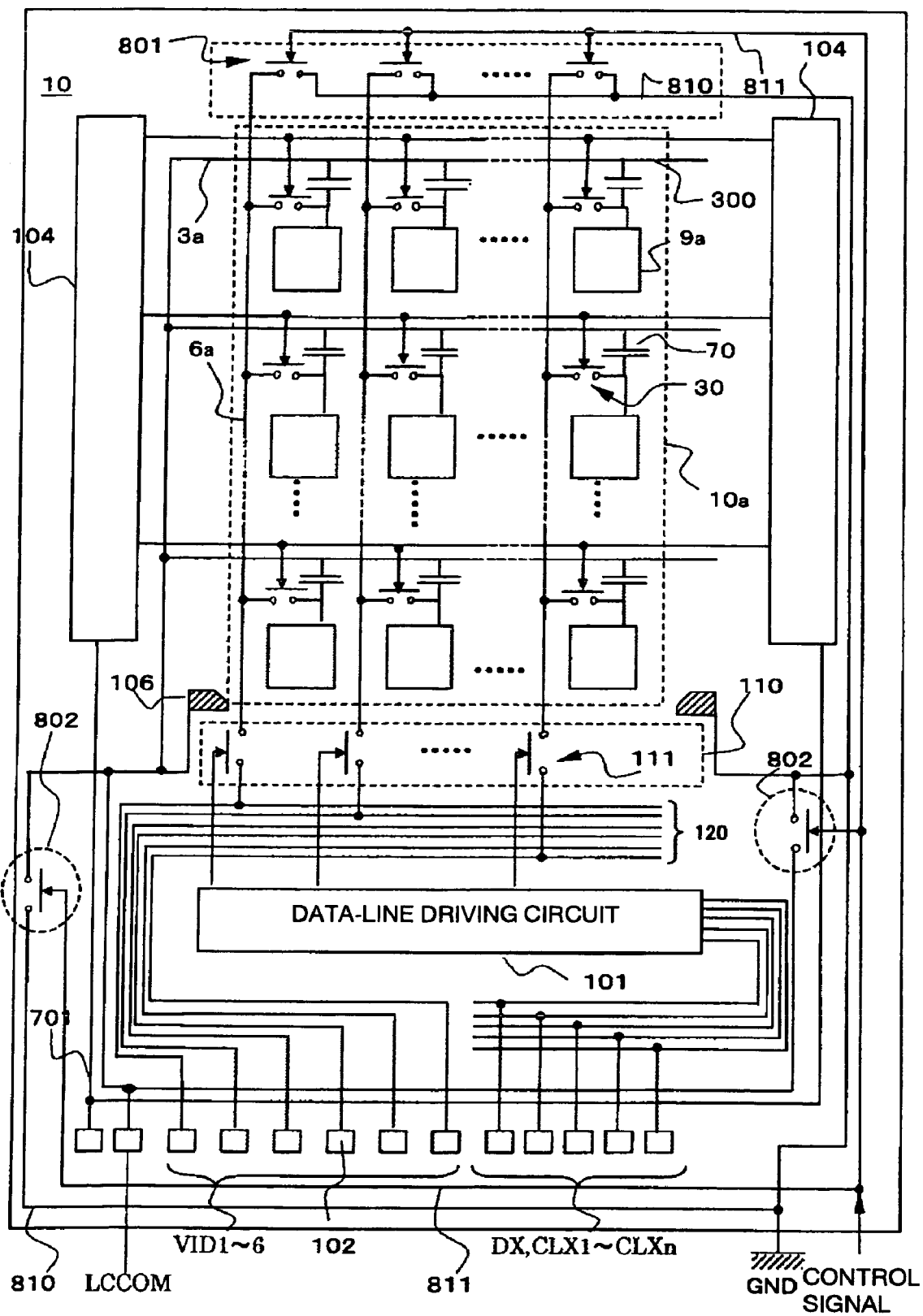
FIG. 3 is a plan view schematically showing the configurations of circuits, such as pixel electrodes, scanning lines, and data lines, formed on the TFT array substrate, and manners of connections between the circuits configuration and various peripheral circuits.

An electrooptic device according to a first embodiment will be first described with reference to FIGS. 1 to 3. FIG. 1 is a plan view of a TFT array substrate and components formed thereon, as viewed from the side of a counter substrate 20, and FIG. 2 is a cross-sectional view, taken along line H–H' in FIG. 1. FIG. 3 is a plan view schematically showing the configurations of circuits, such as pixel electrodes, scanning lines, and data lines, formed on the TFT array substrate, and manners of connections between the circuits and various peripheral circuits.

First, the electrooptic device of the first embodiment is generally shaped by placing a TFT array substrate 10 and a counter substrate 20 opposed to each other, as shown in FIGS. 1 and 2. A liquid crystal layer 50 is sealed between the TFT array substrate 10 and the counter substrate 20, and the TFT array substrate 10 and the counter substrate 20 are bonded together with a sealing material 52 provided in a sealing region around an image display region 10a.

The liquid crystal layer 50 is made of, for example, a liquid crystal in which one or several kinds of nematic liquid crystals are mixed, and has a predetermined alignment state between a pair of alignment films 16 and 22 which will be described in greater detail below. The image display region 10a is a region which is enclosed by a framing shielding film 53, and which transmits light that contributes to image display with pixel electrodes 9a, scanning lines, data lines, and the like formed thereon, as will be described below with reference to FIG. 3. The sealing material 52 can be made of, for example, ultraviolet curing resin or thermosetting resin, and is square in plan view so that it surrounds the image display region 10a. A liquid-crystal inlet 52a for introducing liquid crystal into a space between both the substrates is provided in a portion of the sealing material 52, as shown in the lower part of FIG. 1. In a completed electrooptic device, a sealing member 54 made of, for example, ultraviolet curing acrylic resin is provided corresponding to the position of the liquid-crystal inlet 52a in order to prevent the liquid crystal introduced in the space from leaking outside.

In FIG. 2, an alignment film 16 is formed on pixel electrodes 9a on the TFT substrate 10 after TFTs for pixel switching and lines, such as scanning lines and data lines, are formed. On the other hand, counter electrodes 21 made of a transparent conductive material, such as ITO (Indium Tin Oxide), are placed on the counter substrate 20, and an upper shielding film 23 shaped like a lattice is placed on the counter electrodes 21 corresponding to the pixel electrodes 9a arranged in a matrix on the TFT array substrate 10. An alignment film 22 is formed on the upper shielding film 23. In order to maintain a predetermined cell gap between the TFT array substrate 10 and the counter substrate 20, the sealing material 52 is mixed with a gap material (not shown) serving as a kind of spacer. In general, the gap material is composed of, for example, glass fibers or glass beads, and has a substantially spherical shape.

In the electrooptic device of the first embodiment having such an outer shape, various circuits shown in FIG. 3 are provided on the TFT substrate 10. In FIG. 3, a plurality of scanning lines 3a and a plurality of data lines 6a are formed in parallel in rows and columns inside the image display region 10a as to form a lattice, and pixel electrodes 9a are arranged in a matrix corresponding to the lattice. The scanning lines 3a are made of, for example, a doped silicon film, and the data lines 6a are made of, for example, a metal film, such as an aluminum film, or an alloy film. The pixel electrodes 9a are made of a transparent conductive material, such as ITO or IZO (Indium Zinc Oxide).

The image display region 10a defined by the entire region in which these scanning lines 3a, data lines 6a, and pixel electrodes 9a are formed. In the electrooptic device, each of the pixel electrodes 9a is defined as one pixel, as shown in the figures.

The scanning lines 3a, the data lines 6a, and the pixel electrodes 9a are connected via TFTs 30 serving as switching elements, as shown in FIG. 3. In other words, the data lines 6a, the pixel electrodes 9a, and the scanning lines 3a are connected to sources, drains, and gates of the TFTs 30, respectively. Accordingly, when a scanning signal is supplied to a scanning line 3a existing in a certain row, a TFT 30 existing in the row is ON, and an image signal supplied through a data line 6a is written in a pixel electrode 9a. Consequently, a predetermined electric field corresponding to the image signal is applied to the liquid crystal layer 50.

In the electrooptic device of the first embodiment, each pixel electrode 9a is accompanied with a storage capacitor 70. The storage capacitors 70 is composed of a pair of electrodes having a dielectric film therebetween. One of the electrodes is connected to the drain of the TFT 30, and the other electrode is connected to a capacitor line 300 maintained at a fixed potential. Accordingly, when the TFT 30 is turned on and a predetermined image signal is applied to the pixel electrode 9a, a predetermined electric field corresponding to the image signal is simultaneously stored in the storage capacitor 70. Therefore, the potential holding characteristics of the pixel electrode 9a and the liquid crystal layer 50 are markedly improved, and a high-quality image display becomes possible.

On the other hand, a data-line driving circuit 101 and scanning-line driving circuits 104 are formed outside (on the periphery of) the image display region 10a on the TFT array substrate 10, as shown in FIGS. 1 and 3. A plurality of data lines 6a are connected to the data-line driving circuit 101, and a plurality of scanning lines 3a are connected to the scanning-line driving circuits 104.

More specifically, the data-line driving circuit 101 is provided with an X-side shift register circuit (not shown) or the like. As peripheral circuits and lines for the data-line driving circuit 101, a sample-and-hold circuit 110 having TFTs 111 serving as analog switches that operates in response to a signal output from the X-side shift register circuit, six image-signal lines 120 corresponding to six-phase image signals VID1 to VID6, and the like are formed. Although all are not shown in FIG. 1, a start signal DX, clock signals CLX1 to CLXn (n represents the number of phases), and clock signals CLX1- to CLXn-reverse thereto, and the like are supplied from the outside to the data-line driving circuit 101 via external-circuit connecting terminals 102, depending on the number of phases of the X-side shift register circuit. On the other hand, a start signal DY, a clock signal CLY, and a clock signal CLY-reverse thereto, and the like are supplied from the outside to the scanning-line driving circuits 104 via external-circuit connecting terminals 102. In FIG. 3, because of the paper width, only one external-circuit connecting terminal 102 is connected to the scanning-line driving circuits 104, and other terminals are not shown.

In such data-line driving circuit 101 and its peripheral circuits, the TFTs 111 operate in response to a signal output from the X-side shift register circuit, and image signals VID1 to VID6 supplied via the image-signal lines 120 can be supplied to the data lines 6a at a predetermined timing. In the scanning-line driving circuits 104, a scanning-line signal is supplied to a scanning line 3a in each row at a predetermined timing, and the TFTs 30 are turned on and off in each line. As described above, when the TFT 30 is turned on, an image signal supplied through the data line 6a can be supplied to the pixel electrode 9a.

In FIG. 3 and the like, two scanning-line driving circuits 104 are prepared at both ends of the scanning lines 3a, making it possible to overcome the problem of delay of scanning signals to be sent to the scanning lines 3a. However, it should be understood that the present invention is not limited to such a manner, and only one scanning-line driving circuit 104 may be provided when such a problem does not become apparent.

In addition, in the electrooptic device of the first embodiment, a conductive material 106 can be provided at at least one corner of the counter substrate 20 for electric conduction between the TFT array substrate 10 and the counter substrate 20. A common potential line 701 is connected to the conductive material 106 with one end connected to the external-circuit connecting terminal 102, and a so-called LCCOM (Liquid Crystal COMmon) with potential fixed at a certain value is supplied thereto. Therefore, the counter electrodes 21 on the counter substrate 20 are maintained at the LCCOM potential. The above-described capacitor lines 300 are also connected to the common potential line 701, as shown in FIG. 3, and are maintained at a fixed potential (=LCCOM potential).

In the first embodiment, in particular, TFTs 801 and 802 serving as switching elements are connected to the data lines 6a and the common potential line 701, respectively, as shown in FIG. 3. The TFTs 801 and 802 are connected at one end to a grounded GND line 810. It is determined whether the data lines 6a or the common potential line 701 are connected to the GND line 810, that is, whether the data lines 6a or the common potential line 701 are grounded, depending on the input from a control signal supplied through a control line 811.

The electrooptic device of the first embodiment may also include other structures, for example, a check circuit for checking the quality, defects, and the like of the electrooptic device during production and shipment.

Figure 4:
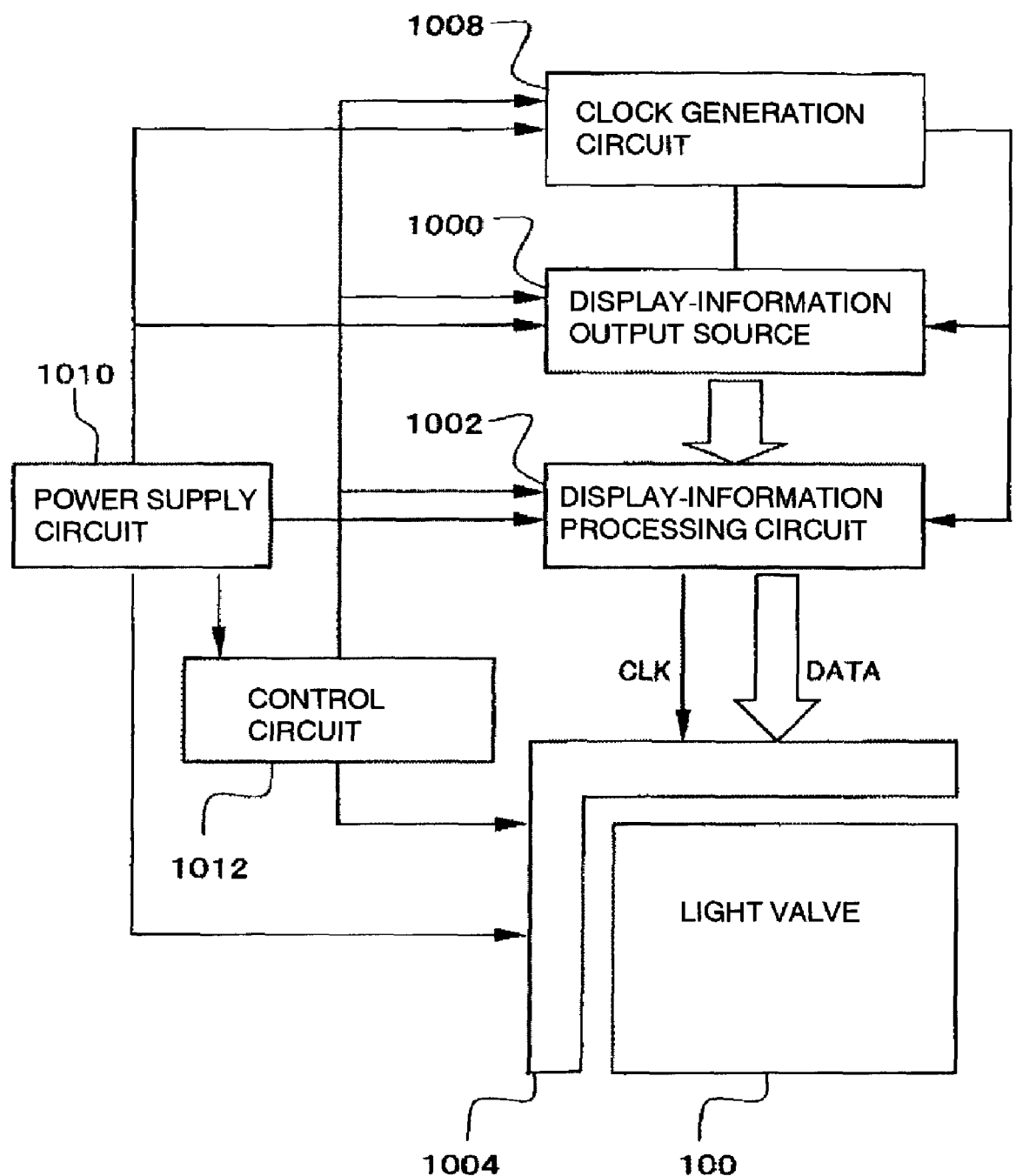
FIG. 4 is an exemplary block diagram showing the circuit configuration of a color liquid crystal projector as an example of a projection display device.
Figure 5:
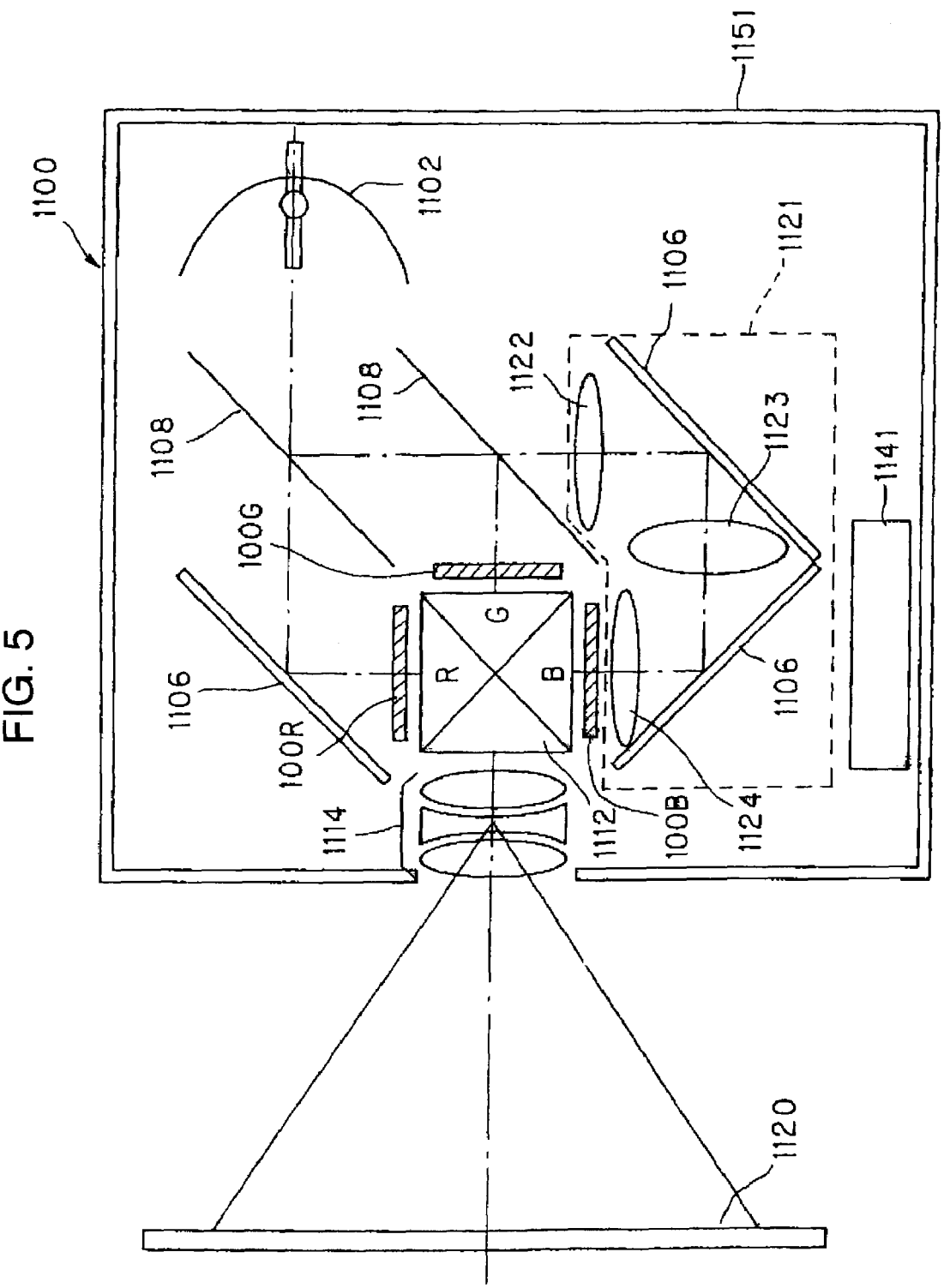
FIG. 5 is a schematic sectional view of the color liquid crystal projector as the example of a projection display device.

The specific configuration of the electrooptic device of the first embodiment is described above. In this embodiment, the electrooptic device is further applied as a light valve in a projection display device as an example of an electronic device. FIG. 4 is an exemplary block diagram showing the circuit configuration of a color liquid crystal projector as an example of a projection display device, and FIG. 5 is a schematic sectional view of the color liquid crystal projector.

First, the circuit configuration of the projection color display device of the first embodiment will be described with reference to the block diagram in FIG. 4. FIG. 4 shows the circuit configuration of one of the three light valves in the projection color display device. The above-described electrooptic device is used in each of the three light valves.

Since the three light valves substantially have the same configuration, a description will be given of the circuit configuration for only one light valve. Strictly, signals input to the three light valves are different (that is, the light valves are driven by corresponding R, G, and B signals). Moreover, the circuit configuration of the G light valve is different from those of the R and B and light valves in that the order of image signals is reversed in each field or frame, or the horizontal or vertical scanning direction is reversed, in order to display inverted images.

In FIG. 4, the projection color display device includes a display-information output source 1000, a display-information processing circuit 1002, a driving circuit 1004, a light valve 100, a clock generation circuit 1008, a power-supply circuit 1010, and a control circuit 1012.

The display-information output source 1000 includes a memory, such as a ROM (Read Only Memory), a RAM (Random Access Memory), or an optical disk device, a synchronizing circuit for synchronously outputting image signals, and the like, and outputs display information, such as a predetermined-format image signal, to the display-information processing circuit 1002 in response to clock signals from the clock generation circuit 1008.

The display-information processing circuit 1002 can include various known processing circuits, such as amplifying and inverting circuits, a phase expansion circuit, a rotation circuit, a gamma correction circuit, and a clamp circuit, sequentially generates digital signals from display information input in response to clock signals, and outputs the digital signals with clock signals CLK to the driving circuit 1004.

The driving circuit 1004 corresponds to the data-line driving circuit 101 and the scanning-line driving circuits 104 described above, and drives the light valve 100. The power-supply circuit 1010 supplies a predetermined power to each of the above circuits. The control circuit 1012 integratedly controls the circuits in order to achieve a harmonious operation of the above circuits. Of course, the control circuit 1012 may have a configuration which can receive modifications of control to execute control, as required, in order to perform processing under a predetermined sequence control, or according to a program prepared in an appropriate program language to achieve a predetermined result.

The driving circuit 1004 may be mounted on the TFT array substrate 10 that constitutes the light valve 100, and the display-information processing circuit 1002 may also be mounted thereon.

The overall configuration (in particular, an optical configuration) of the projection color display device of this embodiment will now be described with reference to FIG. 5.

In FIG. 5, a liquid crystal projector 1100 as an example of a projection display device of the first embodiment is a projector in which three liquid crystal modules, each including a liquid crystal device in which the driving circuit 1004 and the like are mounted on a TFT array substrate, are prepared as R, G, and B light valves 100R, 100G, and 100B.

In the liquid crystal projector 1100, when projection light is emitted from a lamp unit 1102 of a white light source, such as a metal halide lamp, it is separated into light components R, G, and B corresponding to the three primary colors R, G, and B by three mirrors 1106 and two dichroic mirrors 1108, and the light components are guided to the corresponding light valves 100R, 100G, and 100B. In this case, in particular, the B light is guided through a relay lens system 1121 including an incident lens 1122, a relay lens 1123, and an emergent lens 1124 in order to prevent light loss due to its long optical path. The light components modulated by the light valves 100R, 100G, and 100B corresponding to the three primary colors are combined again by a dichroic prism 1112, and are then projected as a color image onto a screen 1120 through a projection lens 1114.

A ventilating fan 1141 is mounted in the projection color display device to blow air to the light valves 100R, 100G, and 100B. The ventilating fan 1141 aims to reduce the accumulation of heat in the light valves 100R, 100G, and 100B mainly caused by high-intensity light emitted from the lamp unit 1102. Furthermore, the ventilating fan 1141 continues rotation for a while after the light valves 100R, 100G, and 100B are powered off. This is because a considerable amount of heat is accumulated in the light valves 100R, 100G, and 100B immediately after the use of the projection display device of this embodiment. Accordingly, in the first embodiment, there is a time lag between a time point at which the light valves 100R, 100G, and 100B are powered off and a time point at which the projection display device is powered off.

Figure 6:
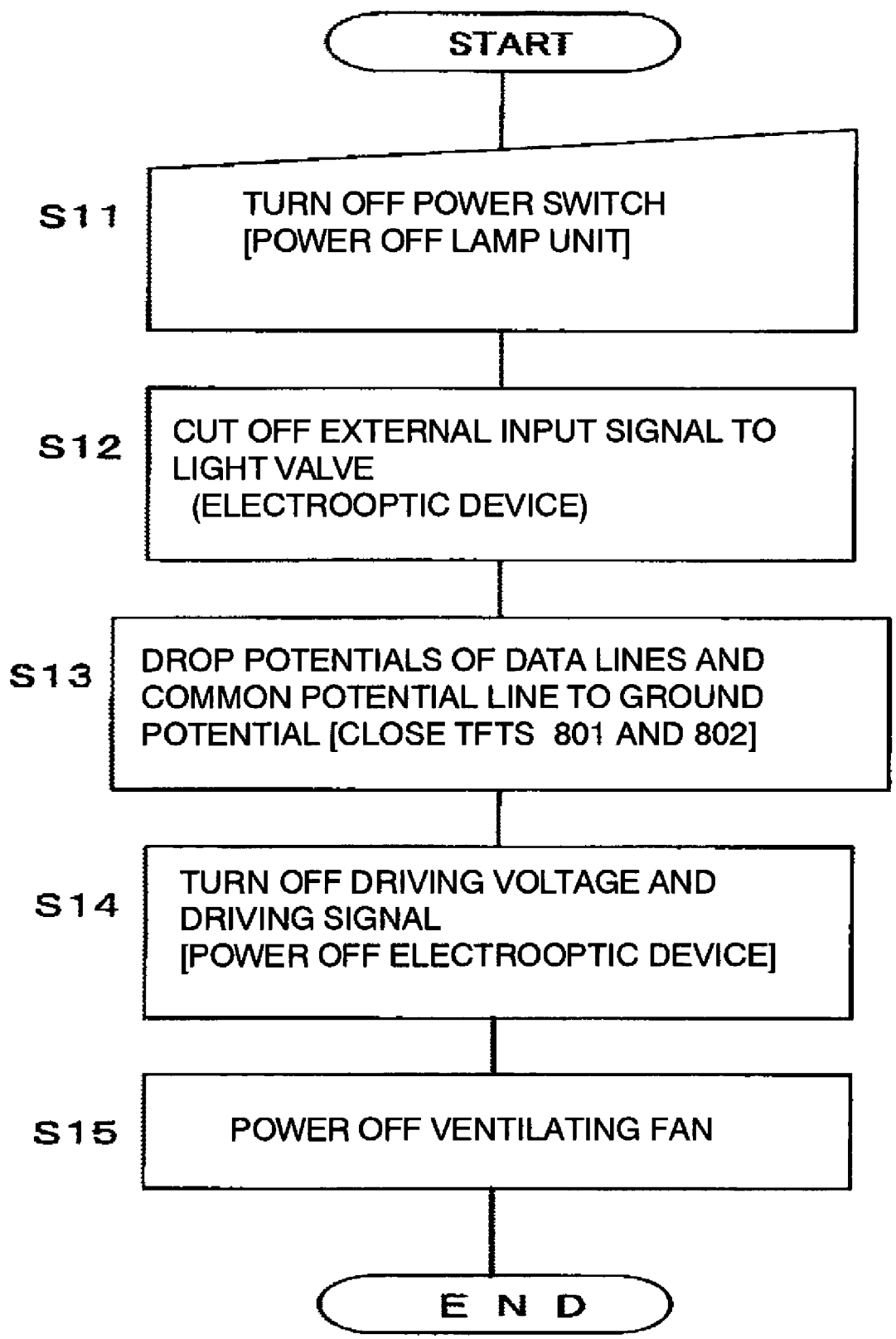
FIG. 6 is a flowchart showing the flow of an exemplary procedure for turning off a projection display device according to a first embodiment.

A driving method for the electrooptic device or the projection display device having such a configuration, in particular, a method for powering off the device is shown in FIG. 6. FIG. 6 is a flowchart showing the flow of an exemplary procedure for powering off the projection display device of the first embodiment.

In order to power off the projection display device of the first embodiment, first, an operation of turning off the power switch is manually performed by a device user (Step S11). In this case, the lamp unit 1102 is powered off, and light is not projected onto the light valves 100R, 100G, and 100B. Therefore, image display is not performed. Subsequently, processes shown in FIG. 6 are performed automatically by the device, more specifically, by the control circuit 1012 according to a predetermined program.

That is, first, external input signals to the light valves 100R, 100G, and 100B are blocked (Step S12). Herein, the external input signals (Step S12) refer to signals output through the display-information output source 1000 and the display-information processing circuit 1002 shown in FIG. 4. In short, they refer to signals representing images (of course, including motion pictures) to be displayed during normal operation of the projection display device. It is needless to say that other sources of image signals are, for example, signals read from a video tape or a DVD loaded in a video recorder or a DVD player connected to the projection display device of the first embodiment.

Secondly, the above-described TFTs 801 and 802 are closed to drop the potentials of the data lines 6a and the common potential line 701 to a ground potential (Step S13). In this case, since the potentials of the data lines 6a and the common potential line 701 are dropped to the ground potential by closing the TFTs 801 and 802, charges held between the TFT array substrate 10 and the counter substrate 20 having the liquid crystal layer 50 therebetween, that is, between the pixel electrodes 9a and the counter electrodes 21 are removed through the data lines 6a, the counter electrodes 21, and the conductive material 106. Furthermore, in the first embodiment, since the capacitor lines 300 are connected to the common potential line 701, charges accumulated in the storage capacitors 70 can also be removed by dropping the potentials of the common potential line 701 to the ground potential.

Subsequently, a driving voltage and a driving signal are turned off (the electrooptic device is powered off) (Step S14), and finally, the ventilating fan 1141 is powered off (Step S15), so that the operation of powering off the projection display device is completed.

The driving voltage refers to a voltage applied to drive the light valves 100R, 100G, and 100B, and more specifically, to two kinds of voltages, namely, a +V volt and a −V volt shifted by an absolute value V from the above-described LCCOM potential (precisely, a (LCCOM+V) volt and a (LCCOM−V) volt), for example, when a so-called 1H inversion driving method is performed. In this case, since the level of the voltage to be applied to the liquid crystal layer 50 can be inverted in each field, deterioration of the liquid crystal can be prevented. Furthermore, the driving signal refers to signals, such as the start signals DX and DY and the clock signals CLX1 to CLXn, that drive the data-line driving circuit 101, the scanning-line driving circuits 104, and the like at a predetermined timing, as described above. Incidentally, it can be considered that the light valves and the electrooptic device are practically powered off at the same time as these driving voltages and driving signals are turned off.

Since the potentials of the data lines 6a and the common potential line 701 can be dropped to the ground potential by the TFTs 801 and 802 in this way in the electrooptic device or the projection display device of the first embodiment, charges accumulated in the liquid crystal capacitors, the storage capacitors 70, and the like in the electrooptic device can be effectively removed. By performing such operation immediately before the electrooptic device is powered off, as shown in FIG. 6, the above-described charges accumulated during operation can be removed effectively. Therefore, it is possible to prevent an afterimage due to the above charges from being displayed on an image in subsequent use (that is, when the power is turned on again and the device is restarted). As described above, the first embodiment allows high-quality images to be displayed.

While the potentials of the data lines 6a and the common potential line 701 are dropped to the ground potential before the electrooptic device is powered off in the above embodiment, it should be understood that the present invention is not limited to such an embodiment. In some cases, the above operation may be performed after the electrooptic device is powered on. Furthermore, the present invention does not positively reject an exceptional manner in which the potentials of the data lines 6a and the common potential line 701 are dropped to the ground potential during operation.

As described above, while the electrooptic device having the TFTs 801 and 802 is applied to the light valves 100R, 100G, and 100B of the projection display device in the above embodiment, it should be understood that the present invention is not limited to such an embodiment. For example, it is, of course, possible to apply the electrooptic device of the present invention to various electronic devices such as a liquid crystal display and a display of a portable telephone. This identically applies to the second and subsequent embodiments which will be described below.

While the potentials of the data lines 6a and the common potential line 701 are dropped to the ground potential in the above embodiment, the present invention is not limited to such an embodiment. For example, in a case in which a precharge circuit is provided to supply a precharge signal at a predetermined voltage level to a plurality of data lines 6a through a precharge line, prior to an image signal, a switching element for grounding the precharge line, or a circuit including the element may be provided. It is obvious that such a manner can provide operational advantages substantially similar to those in the above embodiment.

In addition, while the TFTs 801 and 802 are formed on the TFT array substrate 10 together with the pixel electrodes 9a, the scanning lines 3a, the data lines 6a, and the like in the above embodiment, it should be understood the present invention is not limited to such an embodiment. For example, switching elements or the like substantially similar to the TFTs 801 and 802 may be provided outside the TFT array substrate 10, and a ground potential may be supplied to the data lines 6a, the common potential line 701, and the like by the switching elements and the external connecting terminals 102. However, in the above manner in which the TFTs 801 and 802 are formed on the TFT array substrate 10, for example, the TFTs 801 and 802 and the pixel-switching TFTs 30 serving as-the first thin film transistors can be formed simultaneously, and therefore, the production labor and cost can be reduced, compared with a case in which they are separately formed. Moreover, this can be considered contributory to size reduction of the device. That is, it is worthy of special note that the first embodiment can provide such advantages.

Figure 7:
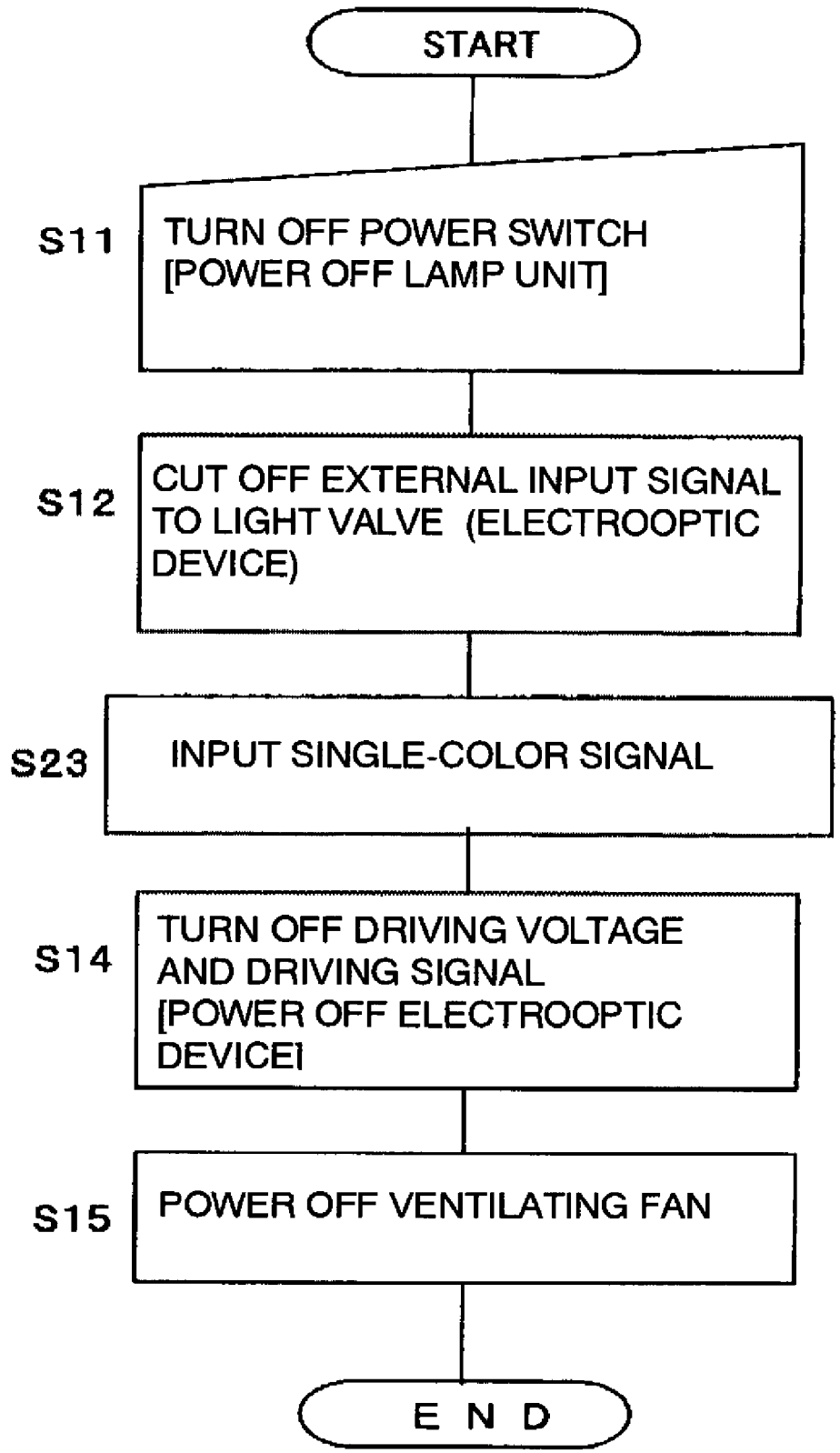
FIG. 7 is a flowchart showing the flow of an exemplary procedure for turning off a projection display device according to a second embodiment.

A second embodiment of the present invention will be described below with reference to FIG. 7. FIG. 7 is a flowchart showing the flow of an exemplary procedure for powering off a projection display device of the second embodiment. The structures of an electrooptic device or a projection display device of the second embodiment are identical to those in the above first embodiment. As is evident from the following description, even when the TFTs 801 and 802, the ground lines 810, and the control line 811, which are characterizing elements of the first embodiment, are not provided in the second embodiment, this does not have any influence on the operational advantages.

In the second embodiment, first, operations of turning off a power switch and of cutting off external input signals to light valves 100R, 100G, and 100B are identically performed in Steps S11 and S12 in FIG. 7.

In the second embodiment, in particular, an image signal representing image display of the single-color, that is, a single-color signal is supplied to pixel electrodes 9a after the above operations (Step S23). This operation is performed through data lines 6a by the actions of a control circuit 1012, display-information output source 1000, display-information processing circuit 1002, image signal line 120, a sample-and-hold circuit 110, a data-line driving circuit 101, and the like. A specific form of the single-color signal is determined by the driving mode of the light valves 100R, 100G, and 100B. In other words, in a normally white mode in which the alignment state of liquid crystal molecules that constitute a liquid crystal layer 50 changes in a direction to reduce the light transmittance depending on the applied voltage, the single-color signal is a full-white level signal. Conversely, in a normally black mode, the signal is a full-black level signal. In the second embodiment, the single-color signal is supplied to all the pixel electrodes 9a lying inside an image display region 10a.

By applying such a single-color signal, a state in which voltage is not applied to the pixel electrodes 9a appears. Therefore, charges accumulated in liquid crystal capacitors and storage capacitors 70 lying inside the image display region 10a can be removed effectively.

Subsequently, a driving voltage and a driving signal are turned off (the electrooptic device is powered off) (Step S14), and finally, a ventilating fan 1141 is powered off (Step S15), in a manner similar to that in the above first embodiment. Consequently, the operation of powering off the projection display device of the second embodiment is completed.

While the potentials of the data lines 6a and the common potential line 701 are not dropped to the ground potential in the second embodiment, which is different from the above first embodiment, a similar operational advantage can be achieved, that is, charges accumulated in the electrooptic device can be removed, by using the single-color signal. In this respect, while discharging is achieved by hardware in the first embodiment, it is achieved by software in the second embodiment.

Anyway, in the second embodiment, an afterimage or the like due to charges during operation will not be displayed on an image in a subsequent use, in a manner similar to that in the first embodiment.

As is evident from the above description, in the second embodiment, it is not always necessary to provide switching elements such as the TFTs 801 and 802 described in the first embodiment. This is because the control operation of applying a single-color signal, such as a full-white level signal or a full-black level signal, to the pixel electrodes 9a, can be executed in the electrooptic device in the existing state by changing a program or the like of the control circuit 1012 without providing the elements. Of course, the scope of the invention includes a manner in which the potentials of the data lines 6a, the common potential line 701, and the like are dropped to the ground potential by providing the TFTs 801 and 802 and in which a single-color signal is applied as in the second embodiment together. In this case, since charges accumulated in the electrooptic device can be removed by software and hardware processing, it can be easily expected that the quality of image display will be improved.

While only the manner in which the electrooptic device is powered off has been described above, it should be understood that the present invention is not limited to such a manner. For example, as shown in FIG. 8, similar operations may also be performed when the electrooptic device is powered on.

Figure 8:
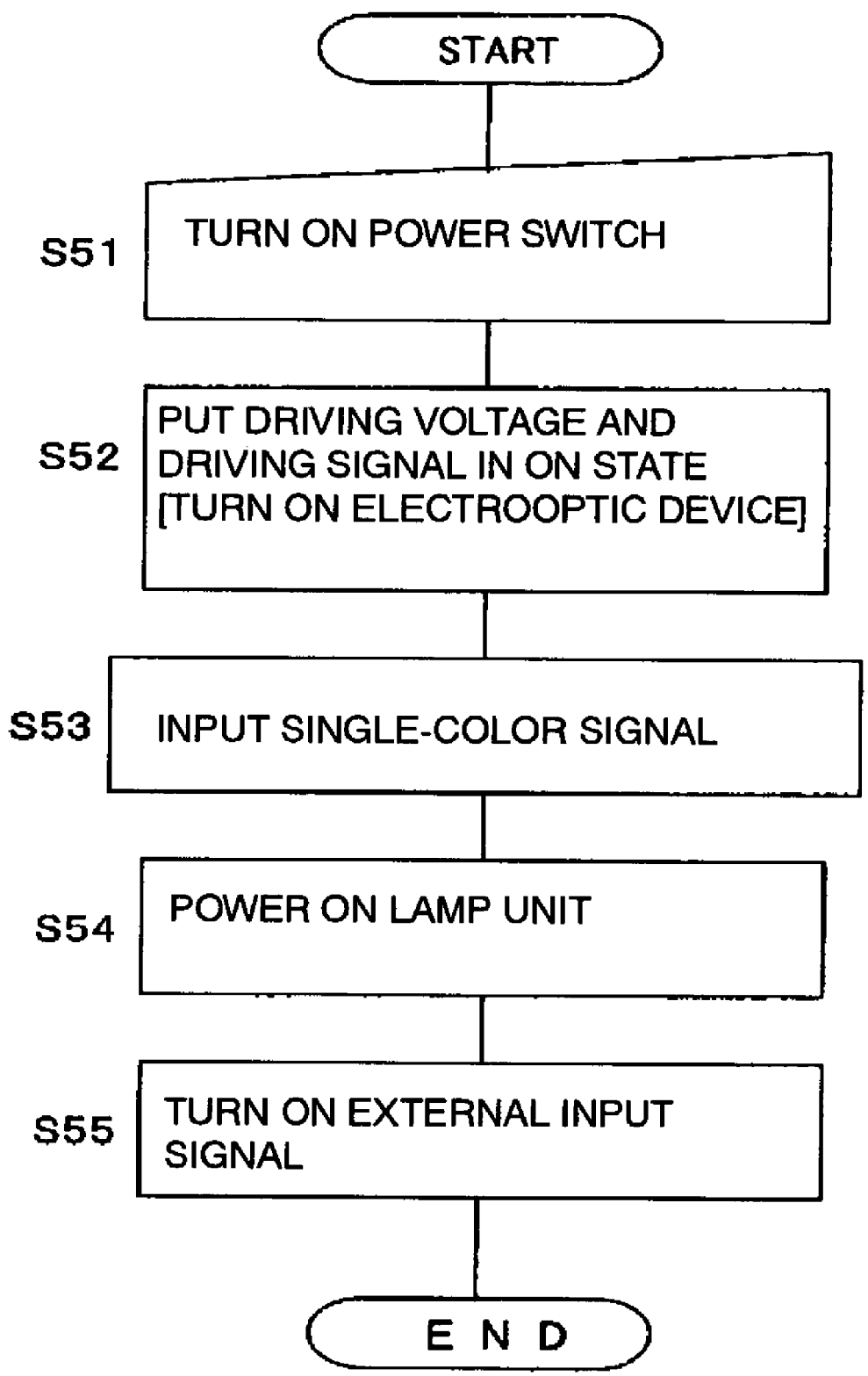
FIG. 8 is flowchart showing the flow of a procedure for turning on the projection display device according to the second embodiment.

In FIG. 8, when an operation of turning on a power switch is first manually performed by the device user (Step S51), a driving voltage and a driving signal for the light valves 100R, 100G, and 100B are turned on (Step S52), and after that the above-described single-color signal is then input to the light valves (Step S53). At this time, charges in the preceding use are removed. Subsequently, the lamp unit is powered on (Step S54), and external input signals are turned on (Step S55).

In this case, although the time point at which a single-color signal is applied is different from that in FIG. 7 that has been referred to in the above description, an action of discharging accumulated in the electrooptic device before normal use is similarly performed. Therefore, operational advantages substantially similar to those in the above can also be achieved.

The inner configuration of the electrooptic device, which cannot be mentioned above, that is, more detailed structures of TFTs, pixel electrodes, scanning lines, data lines, and the like will be described below with reference to FIGS. 9 and 10.

Figure 9:
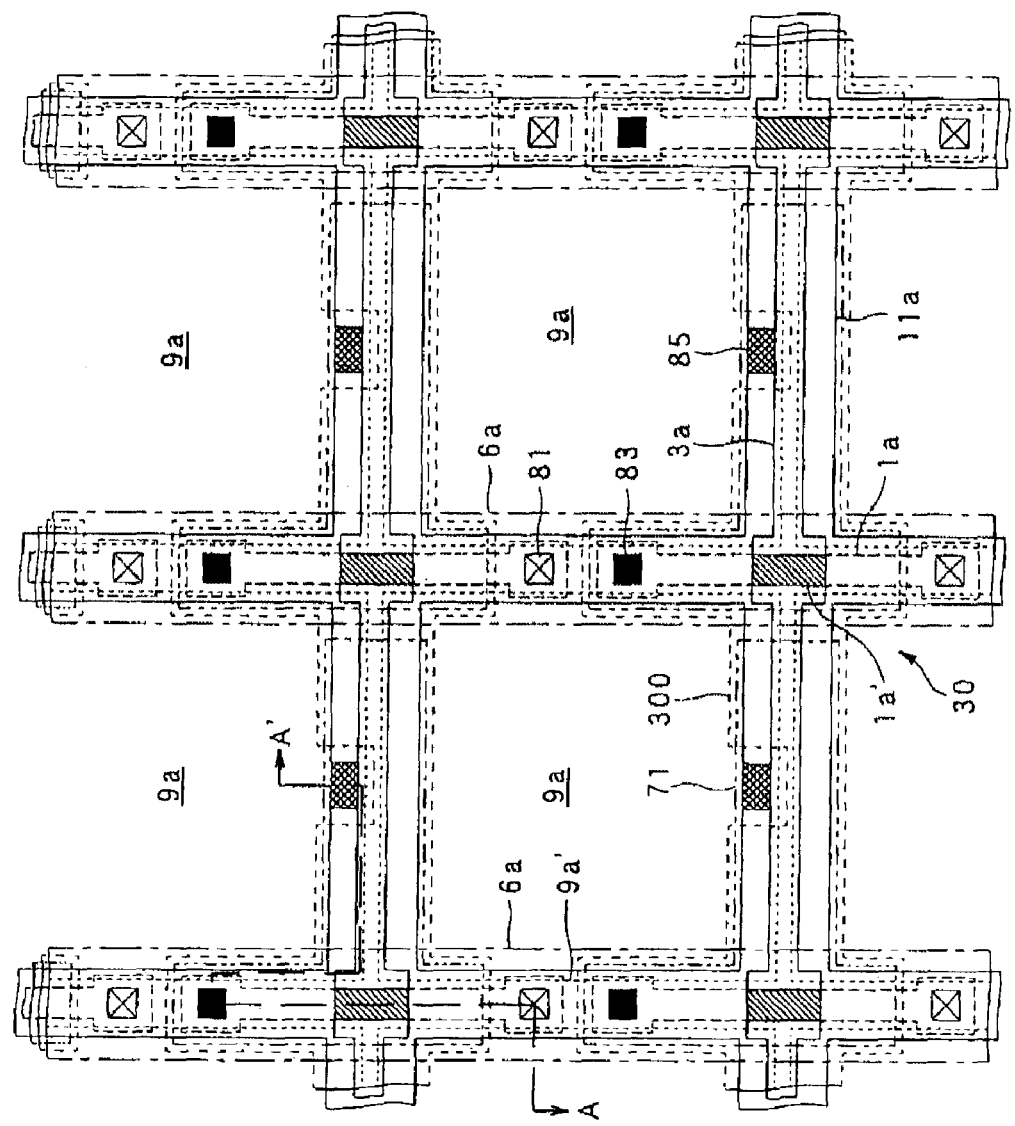
FIG. 9 is a plan view of a plurality of adjoining pixels on a TFT array substrate of an electrooptic device according to an embodiment of the present invention, on which substrate data lines, scanning lines, pixel electrodes, and the like are formed.

The electrooptic device of this embodiment includes a transparent TFT array substrate 10, and a transparent counter substrate 20 opposing the TFT array substrate 10, as shown in FIG. 10 as a cross-sectional view taken along line A–A' in FIG. 9. The TFT array substrate 10 can be formed of, for example, a quartz substrate, a glass substrate, or a silicon substrate, and the counter substrate 20 is formed of, for example, a glass substrate or a quartz substrate.

As shown in FIG. 10, pixel electrodes 9$a$ are provided on the TFT array substrate 10, and an alignment film 16 subjected to a predetermined alignment process, such as rubbing, is provided thereon. The pixel electrodes 9$a$ are formed of a transparent conductive film, such as an ITO (Indium Tin Oxide) film. On the other hand, a counter electrode 21 is provided on the entire surface of the counter substrate 20, and an alignment film 22 subjected to a predetermined alignment process, such as rubbing, is provided thereunder. The counter electrode 21 is also formed of a transparent conductive film, such as an ITO film, in a manner similar to that of the above pixel electrodes 9$a$. The above-described alignment films 16 and 22 are formed of a transparent organic film, such as a polyimide film.

On the other hand, in FIG. 9, a plurality of pixel electrodes 9$a$ are provided in a matrix on the TFT array substrate 10 (their outlines are shown by dotted portions 9$a'$), and data lines 6$a$ and scanning lines 3$a$ are provided along the lengthwise and breadthwise boundaries of the pixel electrodes 9$a$. The data lines 6$a$ are formed of a metal film, such as an aluminum film, or an alloy film. The scanning lines 3$a$ are placed to oppose channel regions 1$a'$ of semiconductor layers 1$a$, shaded by upward oblique lines in the figure, and the scanning lines 3$a$ function as gate electrodes. In other words, TFTs 30 for pixel switching in which main line portions of the scanning lines 3$a$ serving as gate electrodes oppose the channel regions 1$a'$ are provided at the intersections of the scanning lines 3$a$ and the data lines 6$a$.

Each TFT 30 has an LDD (Lightly Doped Drain) structure, as shown in FIG. 10, and includes as components the scanning line 3$a$ functioning as a gate electrode, as described above, the channel region 1$a'$ of the semiconductor layer 1$a$ which is made of, for example, a polysilicon film and in which a channel is formed by an electric field from the scanning line 3$a$, an insulating film 2 including a gate insulating film for insulating the scanning line 3$a$ and the semiconductor layer 1$a$, and a lightly doped source region 1$b$, a lightly doped drain region 1$c$, a heavily doped source region 1$d$, and a heavily doped drain region 1$e$ in the semiconductor layer 1$a$.

As described above, production cost can be reduced by simultaneously forming the semiconductor layer 1$a$ of such a TFT 30 and the semiconductor layers of the TFTs 801 and 802.

While it is preferable that the TFT 30 has an LDD structure, as shown in FIG. 10, it may have an offset structure in which impurities are not implanted in the lightly doped source region 1$b$ and the lightly doped drain region 1$c$, or it may be a self-aligned TFT in which high-concentration impurities are implanted by using the gate electrode formed of a part of the scanning line 3$a$ as a mask so as to form heavily doped source and drain regions in a self-aligned manner. While this embodiment adopts a single gate structure in which only one gate electrode of the pixel-switching TFT 30 is placed between the heavily-doped source region 1$d$ and the heavily doped drain region 1$e$, two or more gate electrodes may be placed therebetween. By thus providing the TFT with the dual gate structure, the triple gate structure, or the structure having more gates, a leakage current can be avoided at joint portions between the channel region and the source and drain regions, and the current in an OFF state can be reduced. The semiconductor layer 1$a$ that constitutes the TFT 30 may be a non-single crystal layer or a single crystal layer. The single crystal layer may be formed by a known method such as bonding. By making the semiconductor layer 1$a$ of a single crystal layer, in particular, performance of peripheral circuits can be enhanced.

In FIG. 10, a storage capacitor 70 can be formed by placing a relay layer 71 serving as a pixel-electrode capacitor electrode connected to the heavily doped drain region 1$e$ of the TFT 30 and the pixel electrode 9$a$ to oppose, through dielectric film 75, a part of a capacitor line 300 serving as a fixed-potential capacitor electrode. The storage capacitor 70 allows the potential holding characteristics of the pixel electrode 9$a$ to be improved markedly.

The relay layer 71 is formed of, for example, a conductive polysilicon film, and functions as a pixel-potential capacitor electrode. The relay layer 71 may be made of a single-layer film or a multilayer film containing metal or alloy, in a manner similar to that in the capacitor line 300 which will be described later. The relay layer 71 functions as a pixel-potential capacitor electrode, and also serves to relay and connect the pixel electrode 9$a$ and the heavily doped drain region 1$e$ of the TFT 30 through contact holes 83 and 85. By thus using the relay layer 71, the pixel electrode 9$a$ and the heavily doped drain region 1$e$ can be properly connected through more than two serial contact holes having a relatively small diameter while overcoming technical difficulty in connecting them through one contact hole even when the distance therebetween is long, for example, 2000 nm. This can increase the pixel aperture ratio. Moreover, it is possible to prevent overetching when contact holes are formed.

The capacitor line 300 is formed of, for example, a conductive film containing metal or alloy, and functions as a fixed-potential capacitor electrode. The capacitor line 300 overlaps, in plan view, with a region in which the scanning line 3$a$ is formed, as shown in FIG. 9. More specifically, the capacitor line 300 includes a main line portion extending along the scanning line 3$a$, projecting portions projecting upward from the intersections with the data line 6$a$ along the data line 6$a$, and a narrow portion that is slightly constricted corresponding to the contact hole 85. The projecting portions increase the area in which the storage capacitor 70 is formed, by using the area on the scanning line 3$a$ and the area beneath the data line 6$a$.

Preferably, such a capacitor line 300 is formed of a conductive shielding film containing a high-melting metal, and functions not only as the fixed-potential capacitor electrode of the storage capacitor 70, but also as a shielding layer for shielding the TFT 30 from incident light on the upper side of the TFT 30.

A dielectric film 75 can be formed of a silicon oxide film such as a HTO (High Temperature Oxide) film or a LTO (Low Temperature Oxide) film, or a silicon nitride film having a relatively small thickness of, for example, approximately 5 nm to 200 nm. In order to enlarge the storage capacitor 70, the thinner dielectric film 75 is preferable as long as a sufficient reliability of the film is ensured.

In the electrooptic device of this embodiment, the storage capacitors 70 have an extremely complicated structure in this way. That is, the storage capacitors 70 have a multilayer structure such that they lie on the TFTs 30 and beneath the data lines 6a, as shown in FIG. 10, and as if they are crowded into the non-aperture regions, in other words, such that they form a lattice as a whole through the pixels, as shown in FIG. 9.

It is certain that such a structure provides extremely great operational advantages of higher aperture ratio and brighter high-quality image display. However, it is also difficult to remove charges accumulated in the storage capacitors 70 having such a "complicated" structure.

However, in this embodiment, charges accumulated in such storage capacitors 70 can be effectively removed by using the TFTs 801 and 802 or applying a single-color signal, as described above. Therefore, it is possible to strongly minimize the probability that an afterimage or the like due to the charges will be displayed on an image.

In FIGS. 9 and 10, a lower shielding film 11a is also provided below the TFTs 30. The lower shielding film 11a is patterned in a lattice form to define aperture regions of the pixels. The aperture regions are also defined by the data lines 6a and the capacitor lines 300 crossing the data lines 6a in FIG. 9. It is preferable that the lower shielding film 11a extend from the image display region to the periphery to be connected to a constant-potential source, in order to prevent a potential change from adversely affecting the TFTs 30, in a manner similar to that of the above capacitor lines 300.

A lower insulating film 12 is provided beneath the TFTs 30. The lower insulating film 12 serves to insulate the TFTs 30 from the lower shielding film 11a, and is formed on the entire surface of the TFT array substrate 10 in order to prevent the characteristics of the pixel-switching TFTs 30 from being changed, for example, by roughness due to surface grinding and contamination remaining after cleaning of the TFT array substrate 10.

In addition, a first interlayer insulating film 41 having a contact hole 81 that communicates with the heavily doped source region 1d and a contact hole 83 that communicates with the heavily doped drain region 1e is formed respectively on the scanning line 3a.

The relay layer 71 and the capacitor line 300 are formed on the first interlayer insulating film 41, and a second interlayer insulating film 42 having a contact hole 81 that communicates with the heavily doped source region 1d and a contact hole 85 that communicates with the relay layer 71 is formed thereon.

In this embodiment, ions implanted in the polysilicon films that form the semiconductor layer 1a and the scanning line 3a may be activated by burning the first interlayer insulating film 41 at approximately 1000° C. On the other hand, stress produced adjacent to the interface between the second interlayer insulating film 42 and the capacitor line 300 may be reduced by not subjecting the second interlayer insulating film 42 to such burning.

The data line 6a is formed on the second interlayer insulating film 42, and a third interlayer insulating film 43 having a contact hole 85 that communicates with the relay layer 71 is formed thereon.

The surface of the third interlayer insulating film 43 is planarized by, for example, CMP (Chemical Mechanical Polishing) in order to reduce alignment failure of the liquid crystal layer 50 due to steps formed by various lines and elements lying thereunder. Instead of thus planarizing the third interlayer insulating film 43, or in addition thereto, planarization may be performed by burying lines, such as the data lines 6a, the TFTs 30, and the like in grooves formed in at least one of the TFT array substrate 10, the lower insulating film 12, the first interlayer insulating film 41, and the second interlayer insulating film 42.

It should be understood that the present invention is not limited to the above embodiments, and appropriate modifications are possible without departing from the gist or ideas of the invention readable from the claims and the entire specification. The technical field of the present invention also includes an electrooptic device, a driving method therefor, an electronic device, and a projection display device thus modified.

Moreover, while this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An electrooptic device, comprising:
a first substrate having pixel electrodes, first thin film transistors electrically connected to the pixel electrodes, and scanning lines and data lines electrically connected to the first thin film transistors;
a second substrate opposing the first substrate and having a common electrode;
an electrooptic substance disposed between the first substrate and the second substrate;
a switch that is connected to one end of each data line and supplies an image signal to the each data line; and
a switching element that is connected to another end of the each data line and discharges inside capacitors constituted by the pixel electrodes above the first substrate, the electrooptic substance, and the common electrode above the second substrate,
the switching element including first switching elements provided in the data lines to selectively drop potentials of the data lines to a ground potential.

2. The electrooptic device according to claim 1, further comprising:
storage capacitors that are electrically connected to the first thin film transistors.

3. The electrooptic device according to claim 2, the pixel electrodes being arranged in a matrix, the scanning lines and the data lines being arranged in a form corresponding to the matrix, and the storage capacitors being formed above the first thin film transistors and corresponding to a region in which the scanning lines and the data lines are arranged.

4. The electrooptic device according to claim 1, the switching element being formed on the first substrate and formed of a second thin film transistor, and a semiconductor layer that forms the second thin film transistor being the same as semiconductor layers that form the first thin film transistors.

5. An electrooptic-device driving method that drives an electrooptic device that includes, on a substrate, pixel electrodes, thin film transistors electrically connected to the pixel electrodes, scanning lines and data lines electrically connected to the thin film transistors, the driving method comprising:
applying an image signal representing a single-color image display to the pixel electrodes at at least one point in time after the electrooptic device is powered on and a time point before the electrooptic device is powered off thereby removing accumulated charges inside the electrooptical device.

6. The electrooptic-device driving method according to claim 5, the electrooptic substance including liquid crystal, the electrooptic device being driven in a normally white mode in which the alignment direction of the liquid crystal changes to decrease the light transmittance, depending on a voltage applied to the pixel electrodes, and the image signal being a full-white level signal for a white display on the entire screen.

7. The electrooptic-device driving method according to claim 5, the electrooptic substance including liquid crystal, the electrooptic device being driven in a normally black mode in which the alignment direction of the liquid crystal changes to increase the light transmittance, depending on a voltage applied to the pixel electrodes, and the image signal is a full-black level signal for a black display on the entire screen.

8. The electrooptic-device driving method according to claim 5, the step of applying the image signal to the pixel electrodes through the data lines being performed before the electrooptic device is powered off, and the method further comprising a step of turning off a driving voltage or a driving signal after the application step.

9. The electrooptic-device driving method according to claim 5, the step of applying the image signal to the pixel electrodes through the data lines being performed after the electrooptic device is powered on, and the method further comprising a step of turning on a driving voltage or a driving signal before the application step.

10. An electrooptic-device driving method that drives an electrooptic device that includes, above a substrate, pixel electrodes, thin film transistors electrically connected to the pixel electrodes, and scanning lines and data lines electrically connected to the thin film transistors, the driving method comprising:
  selectively dropping the potentials of the data lines to a ground potential at at least one point in time after the electrooptic device is powered on and a time point before the electrooptic device is powered off.

11. The electrooptic-device driving method according to claim 10, further comprising:
  setting a common potential line to the ground potential, the common potential line being connected to the substrate to maintain a common electrode formed on a counter substrate opposing the substrate with an electrooptic substance therebetween at a fixed potential.

12. An electronic device, comprising:
  an electrooptic device;
  a control unit that controls the electrooptic device;
  a first substrate having pixel electrodes, first thin film transistors electrically connected to the pixel electrodes, and scanning lines and data lines electrically connected to the first thin film transistors;
  a second substrate opposing the first substrate and having a common electrode;
  an electrooptic substance disposed between the first substrate and the second substrate;
  a switch that is connected to one end of each data line and supplies an image signal to the each data line; and
  a switching element that is connected to another end of each data line and discharges inside capacitors constituted by the pixel electrodes above the first substrate, the electrooptic substance, and the common electrode above the second substrate,
  the switching element including first switching elements provided in the data lines to selectively drop potentials of the data lines to a ground potential.

13. A projection display device, comprising:
  a light valve;
  a light source that introduces projection light into the light valve; and
  an optical system that projects the projection light emitted from the light valve,
  the light valve further comprising:
  a first substrate having pixel electrodes, first thin film transistors electrically connected to the pixel electrodes, and scanning lines and data lines electrically connected to the first thin film transistors;
  a second substrate opposing the first substrate and having a common electrode;
  an electrooptic substance disposed between the first substrate and the second substrate;
  a switch that is connected to one end of each data line and supplies an image signal to the each data line; and
  a switching element that is connected to another end of the each data line and discharges inside capacitors constituted by the pixel electrodes above the first substrate, the electrooptic substance, and the common electrode above the second substrate,
  the switching element including first switching elements provided in the data lines to selectively drop potentials of the data lines to a ground potential.

14. The electrooptic device according to claim 1, further comprising:
  a precharge circuit for supplying a precharge signal at a predetermined voltage level to the data lines through a precharge line,
  the switching element including a third switching element provided in the precharge line to selectively drop the potential of the precharge line to a ground potential.

15. The electrooptic device according to claim 1, further comprising:
  a control means for executing control so that the potential of the switching element is dropped to a ground potential at at least one point in time after the electrooptic device is powered on and a time point before the electrooptic device is powered off.

16. The electrooptic device according to claim 1, further comprising:
  the switching element including a second switching element provided in one end of a common potential line, and another second switching element provided in another end of the common potential line,
  the second switching elements maintaining the common electrode at a fixed potential to selectively drop a potential of the common potential line to a ground potential.

* * * * *